United States Patent

Shull et al.

[15] 3,704,663
[45] Dec. 5, 1972

[54] EGG COOKER
[72] Inventors: Robert W. Shull, Cincinnati; Ronald Thompson, Shelby, both of Ohio
[73] Assignee: General Housewares Corp., Terre Haute, Ind.
[22] Filed: Feb. 16, 1971
[21] Appl. No.: 115,173

[52] U.S. Cl. .................................. 99/347, 99/422
[51] Int. Cl. ........................................ A47j 37/10
[58] Field of Search........ 99/347, 345, 346, 339, 380, 99/422, 440; 220/4, 20, 22, 23.83; 126/381, 382

[56] References Cited

UNITED STATES PATENTS

| | | | |
|---|---|---|---|
| 1,455,780 | 5/1923 | Corwin | 99/422 |
| 2,666,551 | 1/1954 | Wyman | 99/440 UX |
| 61,478 | 1/1867 | Smith | 99/380 |
| 1,281,943 | 10/1918 | Gonsalves | 220/22 X |
| 3,020,824 | 12/1962 | Pantermoller | 99/440 X |
| 166,120 | 7/1875 | Malin | 99/422 |
| 2,093,013 | 9/1937 | Jennings | 99/440 |
| 1,949,285 | 2/1934 | Porter | 220/20 UX |
| 664,314 | 12/1900 | Corwin | 99/422 |

Primary Examiner—Peter Feldman
Assistant Examiner—Arthur O. Henderson
Attorney—Prangley, Dithmar, Vogel, Sandler & Stotland

[57] ABSTRACT

An egg cooker of the skillet type having a central water compartment for generating steam for basting and a plurality of separate cooking compartments each of fried egg size for receiving shortening and the yolk and white of an egg, and a removable cover which when in place is spaced from the open tops of the water and cooking compartments, whereby steam produced in the water compartment is directed to the upper surface of eggs in the cooking compartments, producing cooked eggs having the appearance and texture of poached eggs and the flavor of fried eggs.

2 Claims, 4 Drawing Figures

PATENTED DEC 5 1972

3,704,663

Inventors
ROBERT W. SHULL
RONALD THOMPSON
BY Prangley, Clayton,
Mullin, Dithmar & Vogel
ATTYS.

EGG COOKER

BACKGROUND OF THE INVENTION

This invention relates to an egg cooker, and more particularly to a compartmented cooker for the yolks and whites of eggs following removal from the shells.

The cooker of the invention employs a cooking process having some attributes of poaching or steaming and some attributes of frying, producing cooked eggs having the appearance and texture of poached eggs and the flavor of fried eggs.

Compartmented egg cookers adapted to fry eggs and compartmented egg cookers adapted to poach or steam baste eggs both are well known in the prior art. U.S. Pat. Nos. 1,281,943 and 1,319,878 are examples of the former, while U.S. Pat No. 936,965 is an example of the latter. U.S. Pat. No. 2,093,013 discloses an egg cooker having a central water compartment adapted to generate steam for soft boiling or hard boiling eggs in the shell.

SUMMARY OF THE INVENTION

The invention contemplates an egg cooker comprising a shallow skillet having an integral central compartment open only at the top and adapted to receive water for generating steam for basting and a plurality of integral separate cooking compartments of fried egg size horizontally, each open only at the top and adapted to receive shortening and the yolk and white of an egg following removal from the shell, and a cover removably associated with the skillet, the cover when in place spaced from the open tops of the water and cooking compartments, whereby steam generated in the water compartment is directed to the upper surface of eggs in the cooking compartments, producing cooked eggs having the appearance and texture of poached eggs and the flavor of fried eggs.

In more detailed aspect, the open top of the water compartment lies in a plane above the common plane of the open tops of the cooking compartments. Also, the water compartment has a bottom wall lying in a plane above the common plane of the bottom walls of the cooking compartments.

In preferred form, the cooking compartments are generally rectangular in horizontal dimensions, whereby eggs cooked therein have desirable shape for serving on toast and in sandwiches. Further, in a cooker of convenient size, the cooking compartments are four in number and arranged in quadrature relation around the central water compartment.

The egg cooker skillet, including the walls of the water and cooking compartments, advantageously is formed of cast iron, and the cover therefor advantageously is formed of transparent glass possessing suitable thermal characteristics.

Other objects, advantages and details of the invention will be apparent as the description proceeds, reference being had to the accompanying drawings wherein a preferred embodiment of the invention is shown. It will be understood that the drawing and description are illustrative only, and that the scope of the invention is to be measured by the appended claims.

DESCRIPTION OF THE PREFERRED EMBODIMENT

Figure 1:
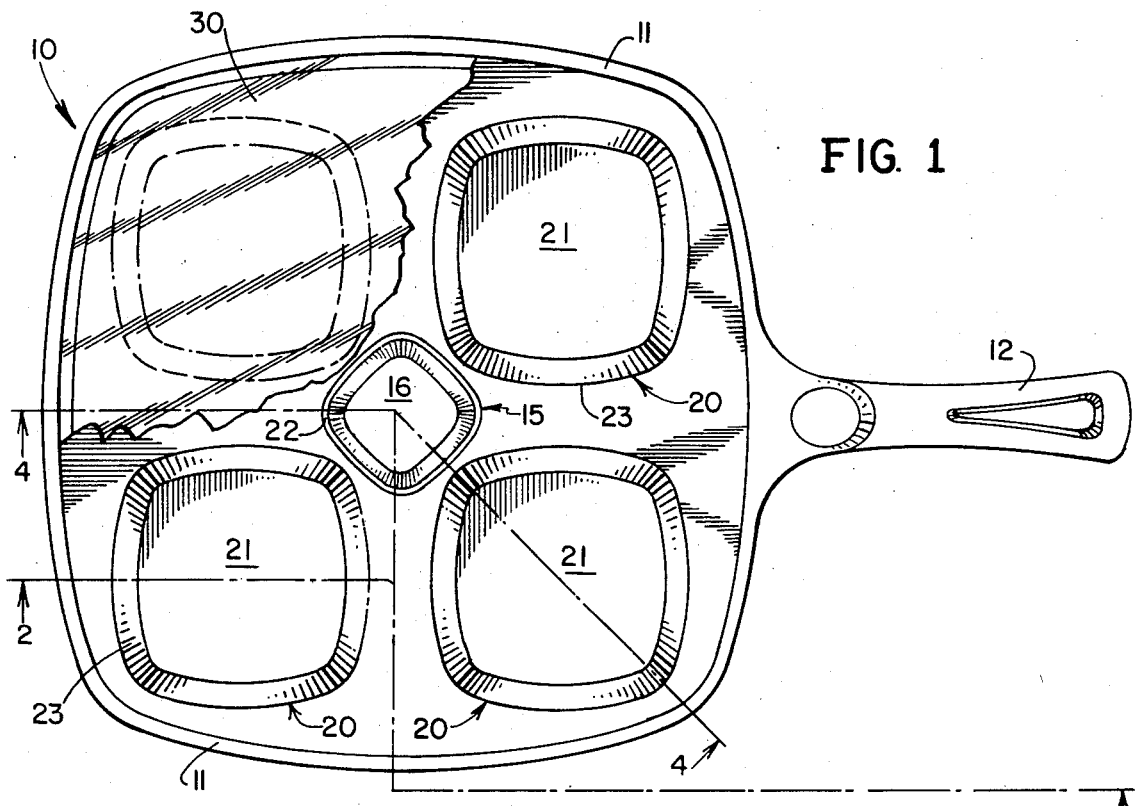
FIG. 1 is a top plan view of an egg cooker embodying the invention, the cover thereof shown broken away for clarity.

Referring first to FIG. 1, an egg cooker 10 embodying the invention comprises a relatively shallow skillet 11 having a convenience handle 12. Preferably the skillet and handle are integral, and formed of cast iron.

Skillet 11 has integral means 15 defining a central compartment 16 open only at the top and adapted to receive water for generating steam for basting.

Skillet 11 also has a plurality of integral means 20 defining a plurality of separate cooking compartments 21 of fried egg size horizontally, each also open only at the top and adapted to receive shortening and the yolk and white of an egg following removal from the shell.

Figure 2:
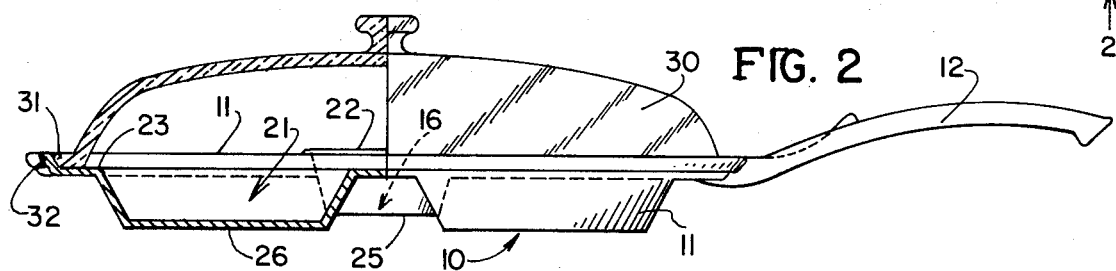
FIG. 2 is a side elevational view, partly in section on irregular line 2—2 of FIG. 1, of the egg cooker.
Figure 3:
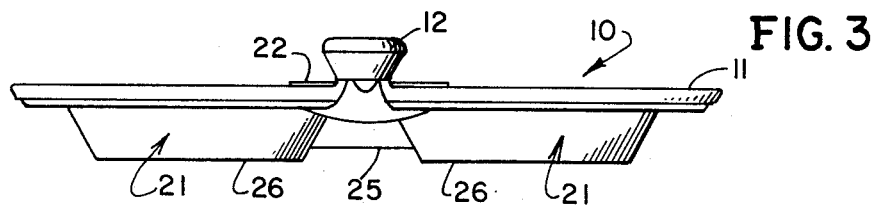
FIG. 3 is an end elevational view of the egg cooker looking from the right of FIG. 1, the cover thereof being omitted.
Figure 4:
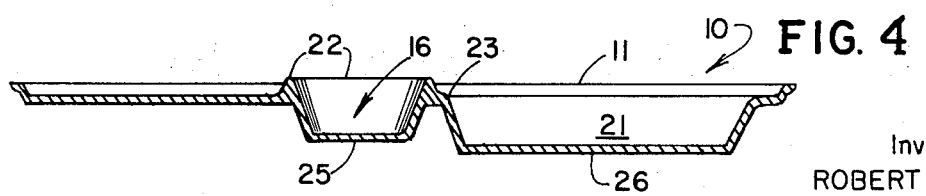
FIG. 4 is a sectional view on irregular line 4—4 of FIG. 1, the cover thereof being omitted.

As best shown in FIGS. 2 and 4, the open top 22 of the water compartment 16 lies in a plane above the common plane of the open tops 23 of the cooking compartments 21, aiding in the even distribution of steam, and bottom wall 25 (FIG. 4) of water compartment 16 lies in a plane above the common plane of the bottom walls 26 (FIGS. 2 and 4) of the cooking compartments 21 which rest on a stove or other source of heat. Thus, water compartment 16 desirably is spaced somewhat from direct contact with the heat source.

A cover 30, preferably of transparent glass having appropriate thermal characteristics, is removably associated with skillet 11, the peripheral edge portion 31 (FIG. 2) of the cover being received within an upstanding peripheral flange 32 of skillet 11. Cover 30 when in place is spaced from the open tops 22 and 23 of the water and cooking compartments 16 and 21, as best shown in FIG. 2.

Referring again to FIG. 1, in preferred form cooking compartments 21 are generally rectangular in horizontal dimensions so that eggs cooked therein have desirable shape for serving on toast and in sandwiches. Further, cooker 10 in convenient size has four cooking compartments 21 arranged in quadrature relation around central water compartment 16.

In use, egg cooker 10 is positioned above a suitable source of heat and preheated. A quantity of water is placed in central water compartment 16, and shortening is placed in one or more of the cooking compartments 21. When frying temperature is reached, eggs are broken into the cooking compartments 21 containing the shortening, and cover 30 is put in place over skillet 11. Thereafter, the level of the heat source may be reduced, following which the water in compartment 16 vaporizes and steam-bastes the upper surface of the eggs, producing cooked eggs that have the appearance and texture of poached eggs and the rich flavor of fried eggs. Cooking time, of course, may be varied to taste.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. An egg cooker, comprising:
    a shallow skillet;
    means integral with said skillet defining a central compartment open only at the top and adapted to receive water for generating steam for basting;
    means also integral with said skillet defining a plurality of separate cooking compartments of fried egg size horizontally, each open only at the top and adapted to receive shortening and the yolk and white of an egg following removal from the shell, the open tops of said cooking compartments lying in a common plane;
    the open top of said central water compartment lying in a plane above the common plane of the open tops of said cooking compartments and the bottom wall of said water compartment lying in a plane above the plane of the bottom walls of said cooking compartments; and
    a cover removably associated with said skillet, said cover when in place spaced from the open tops of said water and cooking compartments,
    whereby steam generated in said water compartment is directed to the upper surface of eggs in said cooking compartments, producing cooked eggs having the appearance and texture of poached eggs and the flavor of fried eggs.

2. The egg cooker of claim 1 wherein said cooking compartments are generally rectangular in horizontal dimensions, whereby eggs cooked therein have desirable shape for serving on toast and in sandwiches.

* * * * *